United States Patent
Wong et al.

(10) Patent No.: US 7,960,985 B2
(45) Date of Patent: Jun. 14, 2011

(54) IDENTIFICATION OF INTEGRATED CIRCUIT

(75) Inventors: Tuan Wong, Vancouver, WA (US); John Rossi, Portland, OR (US); Brian E. Robertson, Portland, OR (US); Paul D. Bliley, Vancouver, WA (US); Maxwell Scott DeHaven, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 185 days.

(21) Appl. No.: 12/254,860

(22) Filed: Oct. 21, 2008

(65) Prior Publication Data

US 2009/0189592 A1    Jul. 30, 2009

Related U.S. Application Data

(60) Provisional application No. 61/062,354, filed on Jan. 25, 2008.

(51) Int. Cl.
*G01R 31/3187* (2006.01)

(52) U.S. Cl. .................................... 324/750.3

(58) Field of Classification Search .................. 324/763, 324/765, 158.1, 76.11, 769, 461, 115; 438/14–18; 257/48; 714/724
See application file for complete search history.

(56) References Cited

U.S. PATENT DOCUMENTS

| | | | |
|---|---|---|---|
| 5,659,257 A * | 8/1997 | Lu et al. ......................... | 324/763 |
| 6,483,335 B1 | 11/2002 | Isberg | |
| 6,894,501 B1 * | 5/2005 | Flasck et al. ................... | 324/416 |
| 7,091,736 B2 * | 8/2006 | Flasck et al. ................... | 324/763 |
| 2002/0105854 A1 | 8/2002 | Huh et al. | |
| 2003/0005274 A1 | 1/2003 | Bresemann et al. | |
| 2003/0151942 A1 | 8/2003 | Bardouillet et al. | |
| 2005/0025495 A1 | 2/2005 | Devine, III et al. | |
| 2005/0237841 A1 | 10/2005 | Wu et al. | |
| 2005/0247997 A1 | 11/2005 | Chung et al. | |
| 2006/0063286 A1 | 3/2006 | Bidermann et al. | |
| 2006/0179047 A1 | 8/2006 | Bresemann et al. | |

* cited by examiner

*Primary Examiner* — Ha Tran T Nguyen
*Assistant Examiner* — Tung X Nguyen

(57) ABSTRACT

An apparatus in an example comprises an integrated circuit and one or more resistors. The integrated circuit comprises an internal current source and an external interface pin. The one or more resistors arc external to the integrated circuit and coupled with the external interface pin of the integrated circuit. Application of current from the internal current source of the integrated circuit to the one or more resistors through the external interface pin serves to generate a voltage that is employed to identify the integrated circuit.

19 Claims, 4 Drawing Sheets

IDENTIFICATION OF INTEGRATED CIRCUIT

CROSS REFERENCE TO RELATED APPLICATIONS

This Application claims the benefit of provisional patent application Ser. No. 61/062,354, filed Jan. 25, 2008 titled "IDENTIFICATION OF INTEGRATED CIRCUIT" which application is incorporated by reference herein as if reproduced in full below.

BACKGROUND

On a given serial bus, unique values as target identifications (TIDs) serve to designate particular devices on the bus.

DESCRIPTION OF THE DRAWINGS

Features of exemplary embodiments of the invention will become apparent from the description, the claims, and the accompanying drawings in which:

DETAILED DESCRIPTION

Referring to the BACKGROUND section above, it may be desirable to promote a reduction in resources employed to identify devices on the serial bus. An exemplary device comprises an integrated circuit (IC) such as an analog IC and/or an application specific integrated circuit (ASIC). An exemplary reduction may employ fewer pins on an interface of an IC for the identification of the IC on the serial bus. A further exemplary reduction may employ fewer external components such as resistors or fewer or zero external sources such as voltage sources relative to an IC for the identification of the IC on the serial bus.

An embodiment employs an Analog to Digital (A2D) system on Analog ASICs. An embodiment reduces the number of pins on the ASIC employed for the identification of the ASIC. An embodiment makes more of the ASIC pins available for functions other than identification of the ASIC. An embodiment saves cost for the ASIC and the overall system.

An embodiment dedicates a single pin on the IC as a target identification (TID) pin. An embodiment promotes avoidance of use of the TID pin for other functions such as General Purpose Input and Output (GPIO). Avoidance of misuse of the TID pins promotes avoidance of connection of large capacitance on the pins and avoidance of different values for the TID such as if an analog ASIC is powering up from a cold state of long off period before power-on or if the analog ASIC has just been reset for a short period before power-on. TID may be generated or re-generated on a power-on or reset event. Where insufficient time is allowed for such a capacitance to return to a desired state then a different TID may be generated depending on if the IC is powering up from a cold state or a reset state.

An embodiment employs a single pin on each IC to generate many unique TIDs and dedicates the pin as a TID pin. The dedicated TID pin of an embodiment ensures that the same unique TID is generated from a particular TID pin regardless whether a cold state power-on or reset causes a TID regeneration.

An embodiment employs the A2D system on the Analog ASICs to generate the unique TIDs. An embodiment employs a single dedicated pin using the A2D. The bands for each possible TID are separated. An embodiment employs a reduced number of resistors. Employing only one pin to generate unique TIDs can promote savings of cost and resources. Employing the dedicated pin can promote robustness.

Figure 1:
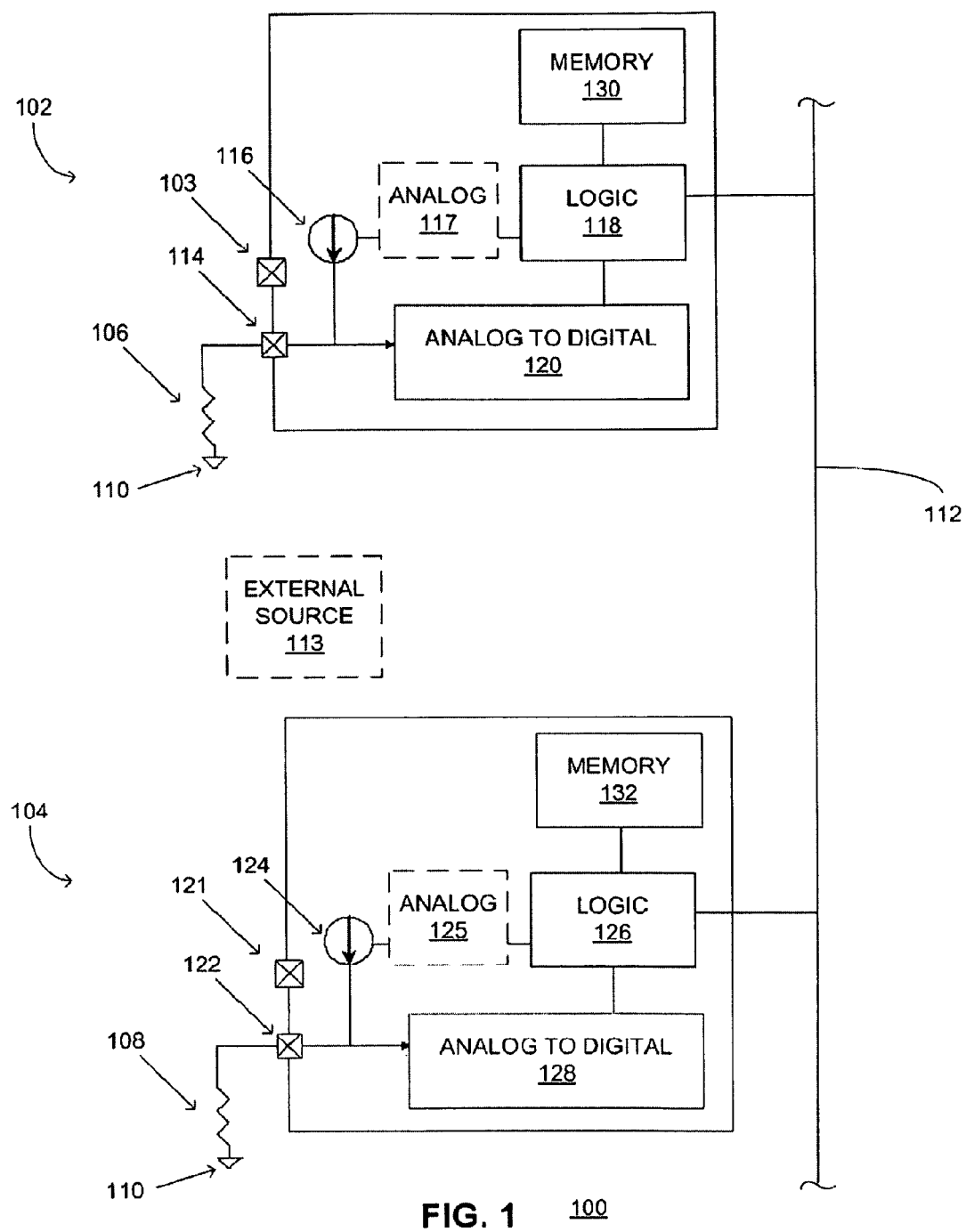
FIG. 1 is a representation of an embodiment of an apparatus that comprises a plurality of devices such as integrated circuits (ICs), a plurality of resistors, a ground, and a bus such as a serial bus, where the apparatus may or may not comprise an external source relative to the ICs.
Figure 2:
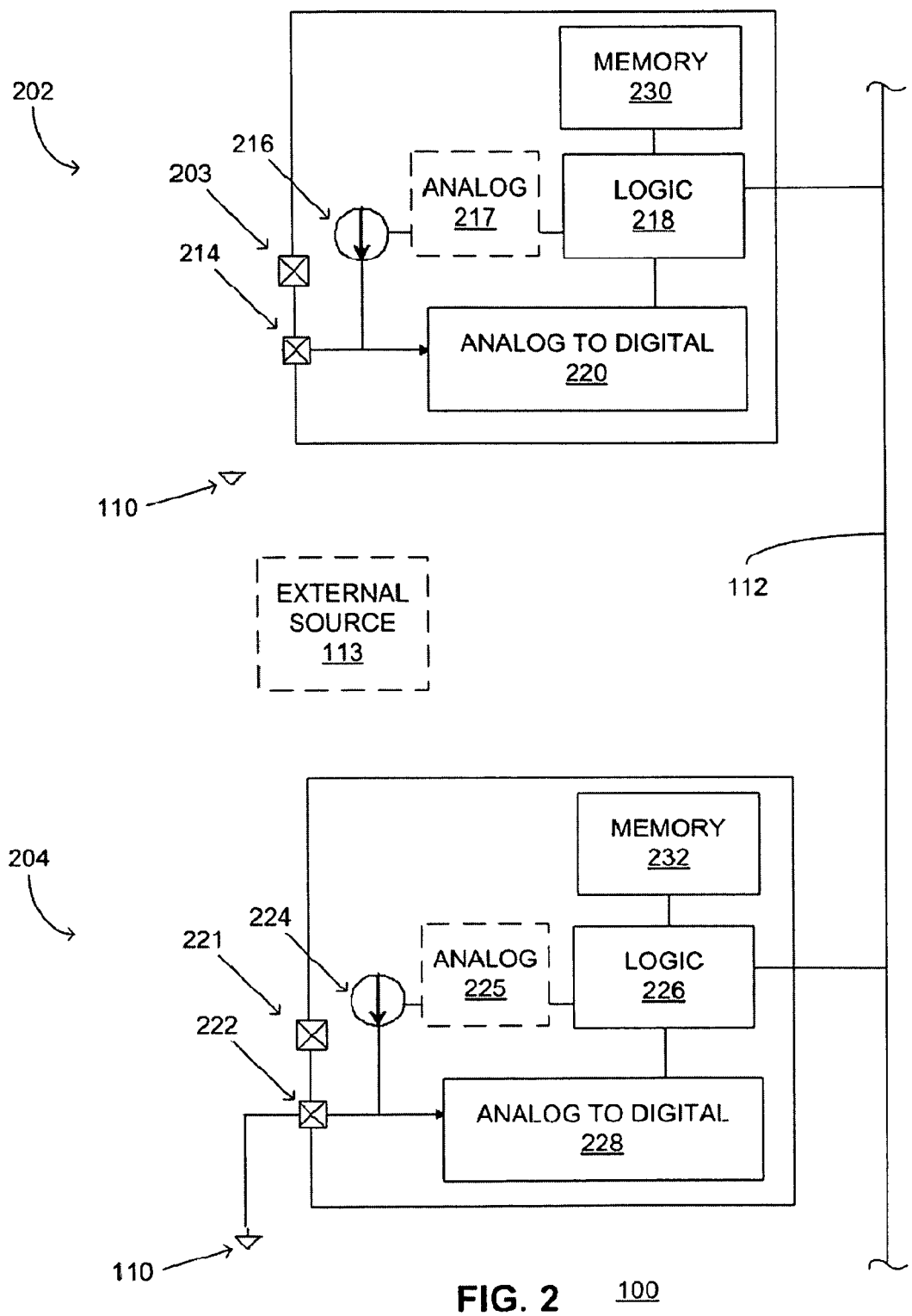
FIG. 2 is a representation of the embodiment of the apparatus of FIG. 1 with a few of the ICs without associated resistors.
Figure 3:
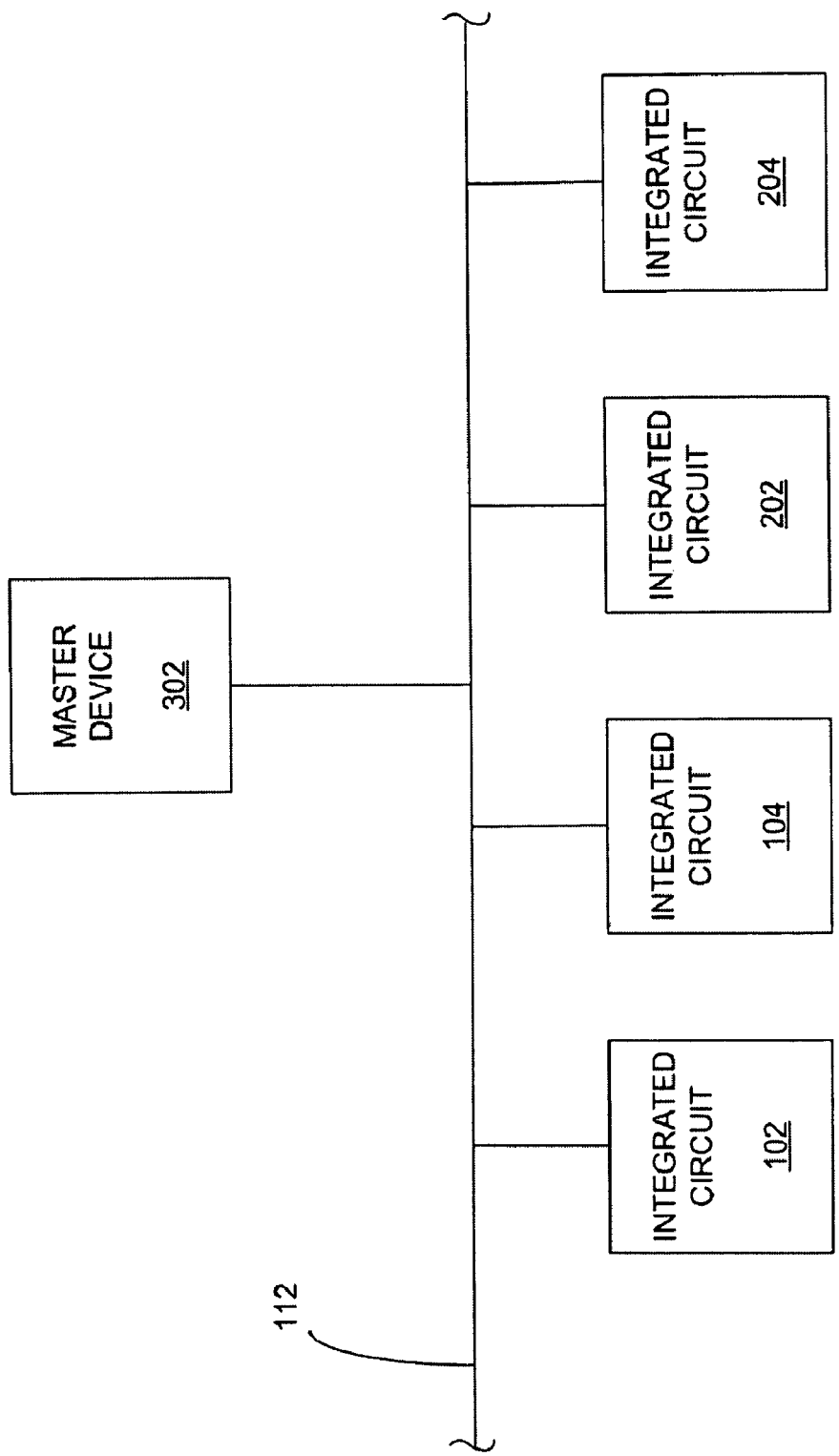
FIG. 3 is a representation of the embodiment of the apparatus of FIG. 1 with a master device coupled with the ICs oil the bus.

Turning to FIGS. 1, 2, and 3, an embodiment of an apparatus 100 comprises a plurality of devices such as integrated circuits (ICs) 102, 104, 202, 204, a master device 302, a plurality of resistors 106, 108, a ground 110, and a bus such as serial bus 112. For example, the apparatus 100 comprises a network. The apparatus 100 may or may not comprise one or more external sources 113 relative to the ICs 102, 104, 202, 204. As described herein, identification of the ICs 102, 104, 202, 204 may be performed without employment of the external source 113. The external source 113 may comprise a voltage source, as will be appreciated by those skilled in the art. The ICs 102, 104 in an example comprise application specific integrated circuits (ASICs).

Referring to FIG. 1, the IC 102 in an example comprises a plurality of external interface pins 103 that comprises a dedicated external interface pin such as dedicated target identification (TID) pin 114, a current source 116, digital to analog (D2A) converter 117, logic 118, analog to digital (A2D) converter 120, and memory 130 such as an internal register. For example, the IC 102 may comprise the D2A converter 117 such as where the current source 116 comprises a preset current source. Another example of the IC 102 may omit the D2A converter 117 such as where the current source 116 comprises a digitally adjustable current source.

Referring to FIGS. 1 and 3, the master device 302 drives respective values as TIDs on the serial bus 112 for the plurality of devices such as the ICs 102, 104, 202, 204 during a transaction on the serial bus 112. A particular TID serves to define a selected IC 102, 104, 202, or 204. The master device 302 in an example drives the TID for the selected target device as the respective IC 102, 104, 202, 204 during a serial interface protocol such as I2C transaction on the serial bus 112. The Target ID voltage as the TID on the bus 112 is read by the logic 118, 126, 218, 226. The value of the TID on the single dedicated pins 114, 122, 214, 222 is sampled and converted to a digital value by the A2D converter 120, 128, 220, 228 that is to be latched by the logic 118, 126, 218, 226 into an internal register as the memory 130, 132, 230, 232. This latched value is to be used by the logic 118, 126, 218, 226 as the Device ID value for a mixed signal IC to decode its TID on the serial interface such as serial bus 112.

The IC 104 in an example comprises a plurality of external interface pins 121 that comprises a dedicated external interface pin such as dedicated TID pin 122, a current source 124, D2A converter 125, logic 126, A2D converter 128, and memory 132 such as an internal register. For example, the IC 104 may comprise the D2A converter 125 such as where the current source 124 comprises a preset current source. Another example of the IC 104 may omit the D2A converter 125 such as where the current source 124 comprises a digitally adjustable current source.

The logic 118, 126 checks the bus 112 for signals and/or information that matches the TID of the IC 102, 104. The logic 118, 126 takes those signals and/or that information for use by the particular IC 102, 104 as destined for the IC 102, 104. Each of the ICs 102, 104 and other devices on the bus 112 comprise a unique TID. The ICs 102, 104 and other devices respond to communication addressed only to the unique TID of the particular IC 102, 104 or other device.

The logic 118, 126 turns ON the current source 116, 124, respectively, activates the A2D converter 120, 128, respectively, and evaluates a result of A2D conversion through the dedicated TID pin 114, 122, generating a voltage across resistors 106 and 108, respectively. The A2D converter 120, 128 serves to quantize the voltage at input pins 114 and 122 that is employed to identify the integrated circuit 102, 104. The A2D converter 120, 128 employs quantizing for sub-division of a larger voltage range into smaller increments so that the logic 118, 126 can map the results to the corresponding TID value.

Each resistor 106, 108 provides a unique voltage value back through the dedicated TID pin 114, 122, respectively, based on the current source 116, 124, respectively. The logic 118, 126 reads the unique voltage value from the dedicated TID pin 114, 122, respectively, through the A2D converter 120, 128, respectively. Each unique voltage value is based on the particular resistor 106, 108. Self-identification of the IC 102, 104 occurs through employment of the resistor 106, 108, respectively.

The ICs 102, 104 may be replicated in the apparatus 100. For example, three or more different ICs 102, 104 on the serial bus 112 comprise different values of the resistor 106, 108 to provide different voltages at power up. The different voltages provide the unique identifiers for each IC 102, 104. The logic 118, 126 employs the A2D converters 120, 128 to map the unique voltage values to unique discrete values. The unique discrete values each map to a respective device identification individual to each IC 102, 104 on the serial bus 112. Changing a value of the resistor 106, 108 associated with each IC 102, 104 serves to identify the particular IC 102, 104.

The internal current sources 116, 124 cooperate with the external resistors 106, 108 to generate the unique identifiers for each IC 102, 104. Changing a value of the internal current sources 116, 124 may serve to provide the unique identifiers for each IC 102, 104. Unique identifiers for each IC 102, 104 are provided through employment of the internal current sources 116, 124 that cooperate with the external resistors 106, 108. Among different ICs 102, 104 the unique identifier result from different voltage values provided to the A2D converters 120, 128. The different voltages may result from variation of the resistors 106, 108 among the ICs 102, 104. The different voltages may result from variation of the current sources 116, 124 among the ICs 102, 104. The different voltages may result from variation of the resistors 106, 108 and the current sources 116, 124 among the ICs 102, 104. In a further example, the current sources 116, 124 may comprise a substantially same value. Where external sources 113 are employed, two different external sources 113 serve to generate two different TIDs for the respective ICs 102, 104.

Referring to FIG. 2, the ICs 202, 204 may omit external resistors for self-identification. The IC 202 may employ a unique value from tying current source 216 to A2D 220 with the dedicated TID pin 214 disconnected to float. For example, the dedicated TID pin 214 floats at a 3.3 V bias. The IC 204 may employ a unique value from tying current source 224 through dedicated TID pin 222 to the ground 110. For example, the dedicated TID pin 222 is grounded to 0 V bias.

The IC 202 in an example comprises a plurality of external interface pins 203 that comprises a dedicated external interface pin such as the TID pin 214, the current source 216, D2A converter 217, logic 218, A2D converter 220, and memory 230 such as an internal register. For example, the IC 202 may comprise the D2A converter 217 such as where the current source 216 comprises a preset current source. Another example of the IC 202 may omit the D2A converter 217 such as where the current source 216 comprises a digitally adjustable current source.

The IC 204 in an example comprises a plurality of external interface pins 221 that comprises a dedicated external interface pin such as the dedicated TID pin 122, the current source 124, D2A converter 225, logic 226, A2D converter 228, and memory 232 such as an internal register. For example, the IC 204 may comprise the D2A converter 225 such as where the current source 224 comprises a preset current source. Another example of the IC 204 may omit the D2A converter 225 such as where the current source 224 comprises a digitally adjustable current source.

Referring to FIGS. 1 and 2, the single dedicated pins 114, 122, 214, 222 on the ICs 102, 104, 202, 204, respectively, provide multiple unique identifications through employment of the logic 118, 126, 218, 226 inside the ICs 102, 104, 202, 204, respectively. The ICs 102, 104, 202, 204 are coupled with the same serial bus 112. The ICs 102, 104, 202, 204 are self-identified. At power up each IC 102, 104, 202, 204 knows its own identity. The IC 102, 104, 202, 204 listens for network commands that comprise the particular identifier for that IC 102, 104, 202, 204.

The number of unique TIDs in an example depends on one or more of: tolerances of the internal current sources 116, 124; accuracy of the A2D converters 120, 128; and/or tolerances of the external resistors 106, 108. Tolerance in an example comprises a permissible range of variation. Tighter and/or smaller tolerances of the internal current sources 116, 124 and/or the external resistors 106, 108 and/or increased accuracy of the A2D converters 120, 128 in an example serve to provide, promote, enhance, increase, and/or translate into better separation of the band for increased number of possible TIDs. The band comprises a sequential group of quantized digital values representing a given voltage range corresponding to a unique TID value. The bands for each possible TID are inherently unique and are separated corresponding to the sequential groupings of digital values in the range of 0 to $(2^n-1)$ where n represents the number of bits of A/D resolution.

An exemplary implementation may employ a plurality of bands of values to represent a respective plurality of TIDs understood by the system 302. An exemplary implementation may employ a single band of values to represent a single TID understood by the system 302. An exemplary implementation may employ a plurality of bands of values to represent each respective TID understood by the system 302. An exemplary implementation may employ a plurality of bands of values to represent a respective plurality of TIDs, as a subset of TIDs understood by the system 302. An exemplary implementation may employ four bands of values to represent the respective four TIDs understood by the system 302 for the respective ICs 102, 104, 202, 204.

Referring to FIGS. 1 and 2, the internal current source 116, 124, 216, 224 may be digitally variable to create one or more sets of TIDs uniquely associated with the ICs 102, 104, 202, 204, wherein the one or more sets of TIDs comprise a new set of TIDs relative to another set of TIDs. The internal current source 116, 124, 216, 224 can be digitally varied, to create a new set of TID values.

The internal current source 116, 124, 216, 224 serves to provide a TID uniquely associated with the IC 102, 104, 202, 204 regardless of variation of a voltage value from the external source 113 coupled with the IC 102, 104, 202, 204. The internal current source 116, 124, 216, 224 allows for generation of the respective TID for each of the ICs 102, 104, 202, 204 regardless of the voltage value of the external source 113 coupled with the IC 102, 104, 202, 204.

The A2D converter 120, 128, 220, 228 is calibratable to promote accuracy of determination of the TID uniquely associated with the respective IC 102, 104, 202, 204. The A2D converter 120, 128, 220, 228 may be calibrated to allow for more accurate determination of the TID uniquely associated with the respective IC 102, 104, 202, 204.

Figure 4:
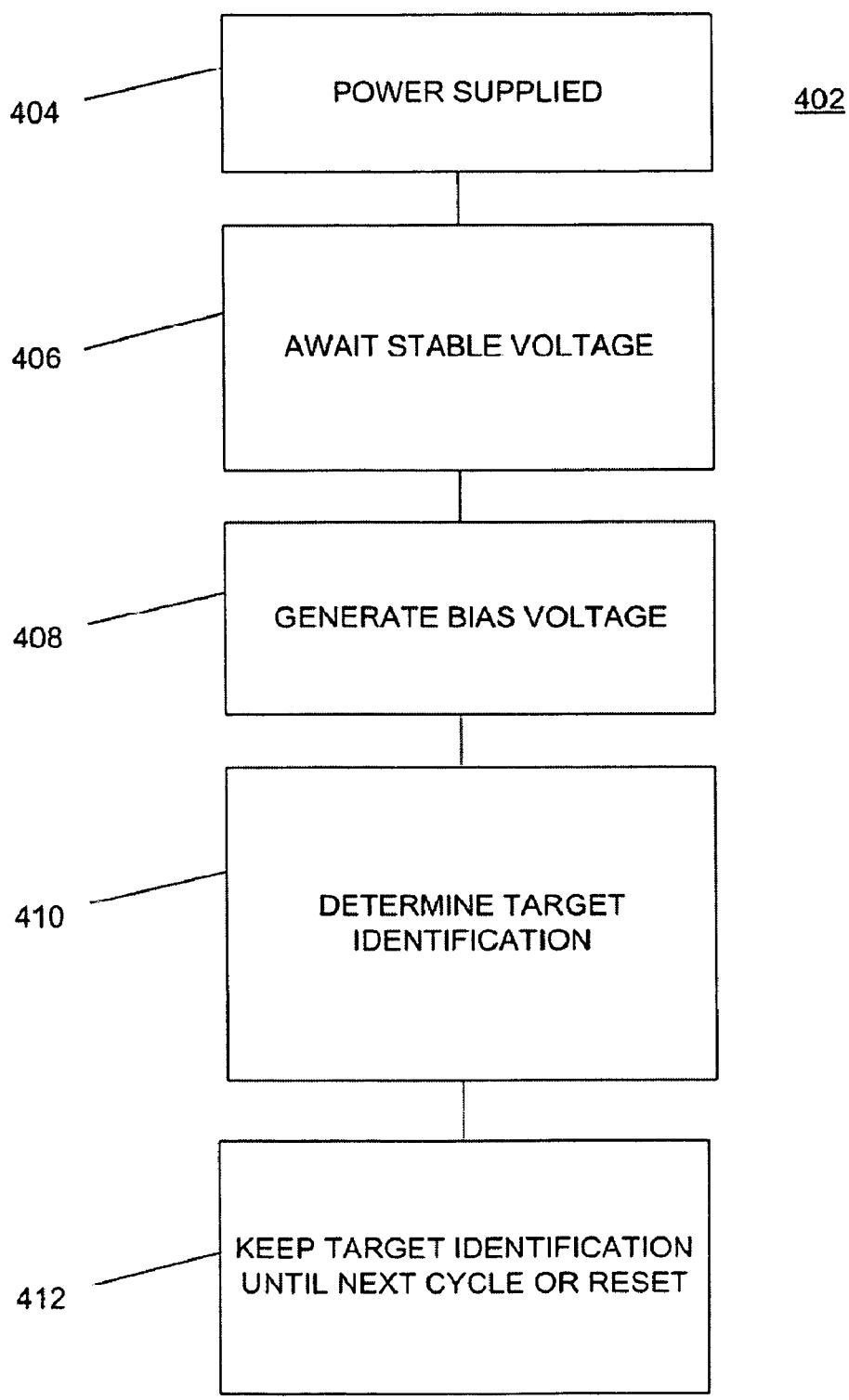
FIG. 4 is a representation of an exemplary message logic flow for power-up of an embodiment of the apparatus of FIG. 1 to generate a target identification (TID) for the respective ICs.

An illustrative description of an exemplary operation of an implementation of the apparatus 100 is presented, for explanatory purposes. Turning to FIG. 4, an exemplary logic flow 402 comprises an IC power-up sequence to generate a TID for a respective IC 102, 104, 202, 204. At STEP 404 the external source 113 supplies power to the IC 102, 104, 202, 204. At STEP 408 the current source 116, 124, 216, 224 supplies current to the dedicated TID pins 114, 122, 214, 222 to generate bias voltages on the resistors 106, 108, where one may consider infinite resistance to appear from the omission of a resistor in IC 202 and no direct such as wire connection to the ground 110 from IC 202, and one may consider substantially zero resistance to appear from the omission of a resistor in IC 204 plus direct such as wire connection to the ground 110 from IC 204.

At STEP 410 the A2D converter 120, 128, 220, 228 serves to measure the bias voltage from the dedicated TID pins 114, 122, 214, 222 to determine the TID for the respective 1C 102, 104, 202, 204. Separation of bands may depend on accuracy of the apparatus 100 such as resolution and/or accuracy of the A2D converter 120, 128, 220, 228, accuracy and/or programmability of the current source 116, 124, 216, 224 and an external resistor 106, 108. The number of bands in an example may be directly related to the resolution of the A2D converter 120, 128, 220, 228. An exemplary four-bit resolution of the A2D converter 120, 128, 220, 228 may provide a total number of sixteen bands as a group of values representing a voltage range corresponding to all exemplary maximum number of sixteen possible unique TID values. At STEP 412 the logic 118, 126, 218, 226 keeps the TID until a next power-cycle and/or reset of the respective IC 102, 104, 202, 204.

Employment of the single dedicated pin 114, 122, 214, 222 on each IC 102, 104, 202, 204 for self-identification leaves available other external interface pins 103, 121, 203, 221 for other functions. This may provide savings of resources and costs for ICs 102, 104, 202, 204 that comprise ASICs as well as for the apparatus 100 overall. The dedicated TID pins 114, 122, 214, 222 in an example serve to ensure that the same unique TID is generated from a particular TID pin 114, 122, 214, 222 regardless whether a cold state power-on or reset causes a TID regeneration.

An embodiment of the apparatus 100 in an example comprises a plurality of components such as one or more of electronic components, chemical components, organic components, mechanical components, hardware components, optical components, and/or computer software components. A number of such components can be combined or divided in an embodiment of the apparatus 100. In one or more exemplary embodiments, one or more features described herein in connection with one or more components and/or one or more parts thereof are applicable and/or extendible analogously to one or more other instances of the particular component and/or other components in the apparatus 100. In one or more exemplary embodiments, one or more features described herein in connection with one or more components and/or one or more parts thereof may be omitted from or modified in one or more other instances of the particular component and/or other components in the apparatus 100. An exemplary technical effect is one or more exemplary and/or desirable functions, approaches, and/or procedures. An exemplary component of an embodiment of the apparatus 100 employs and/or comprises a set and/or series of computer instructions written in or implemented with any of a number of programming languages, as will be appreciated by those skilled in the art. An embodiment of the apparatus 100 in an example comprises any (e.g., horizontal, oblique, angled, or vertical) orientation, with the description and figures herein illustrating an exemplary orientation of an exemplary embodiment of the apparatus 100, for explanatory purposes.

The steps or operations described herein are examples. There may be variations to these steps or operations without departing from the spirit of the invention. For example, the steps may be performed in a differing order, or steps may be added, deleted, or modified.

Although exemplary embodiment of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus; comprising:
   an integrated circuit that comprises an internal current source and an external interface pin; and
   one or more resistors external to the integrated circuit and coupled with the external interface pin of the integrated circuit;
   wherein application of current from the internal current source of the integrated circuit to the one or more resistors through the external interface pin serves to generate a voltage that is employed to uniquely identify the integrated circuit from other integrated circuits.

2. The apparatus of claim 1, wherein the internal current source of the integrated circuit provides the current to the one or more resistors through the external interface pin without participation by a source external to the integrated circuit.

3. The apparatus of claim 1, wherein the internal current source of the integrated circuit generates the voltage that is employed to identify the integrated circuit without participation by a source external to the integrated circuit.

4. The apparatus of claim 1, wherein the one or more resistors comprise a single resistor, wherein the current flows exclusively through the external interface pin from the internal current source of the integrated circuit to the single resistor for generation of the voltage that is employed to identify the integrated circuit.

5. The apparatus of claim 1, wherein the external interface pin communicates the current for generation or the voltage that is employed to identify the integrated circuit without participation by another external interface pin.

6. The apparatus of claim 1, wherein the external interface pin comprises a dedicated target identification (TID) pin that exclusively communicates the current for generation of the voltage that is employed to identify the integrated circuit.

7. The apparatus of claim 6, wherein the integrated circuit comprises an analog to digital converter, coupled with the dedicated TID pin, that serves to quantize the voltage that is employed to identify the integrated circuit.

8. The apparatus of claim 1, wherein the external interface pin comprises a dedicated TID pin of that ensures a same unique TID is generated as the voltage that is employed to identify the integrated circuit from the dedicated TID pin regardless whether a cold state power-on or reset causes a TID regeneration.

9. The apparatus of claim 1 in combination with a plurality of integrated circuits that comprises the integrated circuit, the apparatus further comprising:
a bus coupled with the plurality of integrated circuits;
wherein application of current from the internal current source of the integrated circuit to the one or more resistors through the external interface pin serves to generate a voltage that is employed to uniquely identify the integrated circuit among the plurality of integrated circuits on the bus.

10. The apparatus of claim 9, wherein the external interface pin comprises a dedicated TID pin of the plurality of external interface pins that ensures a same unique TID is generated as the voltage that is employed to uniquely identify the integrated circuit among the plurality of integrated circuits on the bus from the dedicated TID pin regardless whether a cold state power-on or reset causes a TID regeneration.

11. The apparatus of claim 1, wherein the integrated circuit comprises a first integrated circuit, wherein the internal current source comprises a first internal current source, wherein the external interface pin comprises a first external interface pin of a first plurality of external interface pins on the first integrated circuit, wherein the one or more resistors comprise first one or more resistors, the apparatus further comprising:
a second integrated circuit that comprises a second internal current source and a second external interface pin of a second plurality of external interface pins; and
second one or more resistors external to the second integrated circuit and coupled with the second external interface pin of the second integrated circuit;
a bus coupled with the first integrated circuit and the second integrated circuit;
wherein the application of the current from the first internal current source of the first integrated circuit to the first one or more resistors through the first external interface pin serves to generate the voltage that is employed to uniquely identify the first integrated circuit on the bus;
wherein application of a current from the second internal current source of the second integrated circuit to the second one or more resistors through the second external interface pin serves to generate a voltage that is employed to uniquely identify the second integrated circuit on the bus.

12. The apparatus of claim 11, wherein a plurality of integrated circuits on the bus comprises the first integrated circuit and the second integrated circuit;
wherein first external integrated pin comprises a first dedicated TID pin of the first plurality of external interface pins that ensures a same first unique TID is generated as the voltage that is employed to uniquely identify the first integrated circuit among the plurality of integrated circuits on the bus from the first dedicated TID pin regardless whether a cold state power-on or reset causes a TID regeneration;
wherein the second external interface pin comprises a second dedicated TID pin of the second plurality of external interface pins that ensures a same second unique TID is generated as the voltage that is employed to uniquely identify the second integrated circuit among the plurality of integrated circuits on the bus from the second dedicated TID pin regardless whether a cold state power-on or reset causes a TID regeneration.

13. The apparatus of claim 1, wherein the integrated circuit comprises an analog application specific integrated circuit.

14. The apparatus of claim 1, wherein the integrated circuit comprises an analog to digital converter, coupled with the external interface pin, that serves to quantize the voltage that is employed to identify the integrated circuit.

15. The apparatus of claim 1 in combination with a plurality of integrated circuits that comprises the integrated circuit, the apparatus further comprising:
a bus coupled with the plurality of integrated circuits;
wherein the integrated circuit employs a dedicated target identification (TID) uniquely associated with the integrated circuit to respond to communication on the bus addressed only to the TID among other TIDs associated with other integrated circuits in the plurality of integrated circuits.

16. The apparatus of claim 1, wherein the internal current source is digitally variable to create one or more sets of target identifications (TIDs) uniquely associated with the integrated circuit and one or more additional integrated circuits, wherein the one or more sets of TIDs comprise a new set of TIDs relative to another set of TIDs.

17. The apparatus of claim 1, wherein the internal current source serves to provide a target identification (TID) uniquely associated with the integrated circuit regardless of variation of a voltage value from an external source coupled with the integrated circuit.

18. The apparatus of claim 1, wherein the integrated circuit comprises an analog to digital converter that is calibratable to promote accuracy of determination of a target identification (TID) uniquely associated with the integrated circuit.

19. An apparatus, comprising:
an integrated circuit that comprises an internal current source and an external interface pin; and
one or more resistors external to the integrated circuit and coupled with the external interface pin of the integrated circuit;
wherein the internal current source of the integrated circuit provides current to the one or more resistors through the external interface pin, without participation by a source external to the integrated circuit, and generates a voltage that is employed to uniquely identify the integrated circuit from other integrated circuits, without participation by a source external to the integrated circuit.

* * * * *

UNITED STATES PATENT AND TRADEMARK OFFICE
CERTIFICATE OF CORRECTION

PATENT NO.           : 7,960,985 B2            Page 1 of 1
APPLICATION NO.      : 12/254860
DATED                : June 14, 2011
INVENTOR(S)          : Tuan Wong et al.

It is certified that error appears in the above-identified patent and that said Letters Patent is hereby corrected as shown below:

In column 6, line 33, in Claim 1, delete "apparatus;" and insert -- apparatus, --, therefor.

In column 6, line 59, in Claim 5, delete "or" and insert -- of --, therefor.

In column 7, line 4, in Claim 8, delete "pin of that" and insert -- pin that --, therefor.

In column 7, line 55, in Claim 12, after "wherein" insert -- the --.

In column 7, line 55, in Claim 12, delete "integrated" and insert -- interface --, therefor.

Signed and Sealed this
Twenty-seventh Day of December, 2011

David J. Kappos
*Director of the United States Patent and Trademark Office*